M. MAGICH.
HORSESHOE.
APPLICATION FILED DEC. 8, 1917.
1,265,931. Patented May 14, 1918.
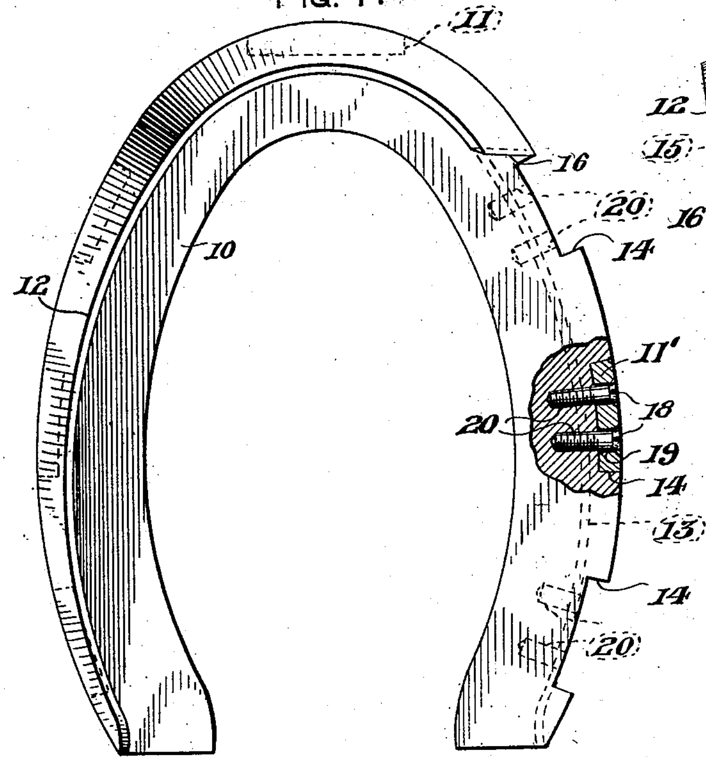
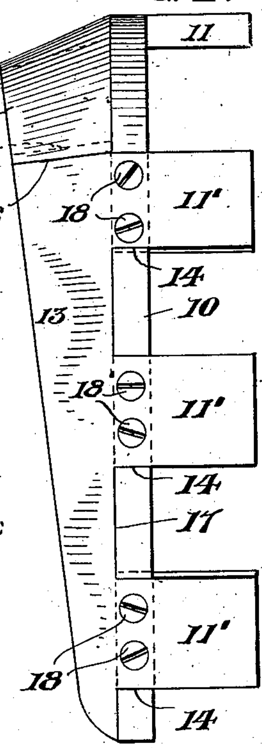
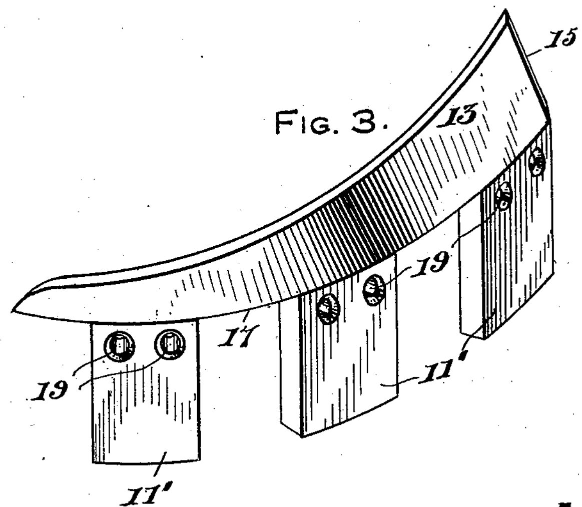
Inventor
M. Magich
By A. M. Wilson
Attorney

UNITED STATES PATENT OFFICE.

MATHEW MAGICH, OF DETROIT, MICHIGAN.

HORSESHOE.

1,265,931. Specification of Letters Patent. Patented May 14, 1918.

Application filed December 8, 1917. Serial No. 206,187.

*To all whom it may concern:*

Be it known that I, MATHEW MAGICH, a subject of the King of Hungary, residing at Detroit, in the county of Wayne and State of Michigan, have invented certain new and useful Improvements in Horseshoes, of which the following is a specification.

The primary object of the invention is the provision of a horseshoe possessing great strength and durability, arranged in two parts for readily assembling upon the hoof of an animal and quickly removable at will.

A further object of the invention is the provision of a horseshoe adapted to be quickly and readily attached in its operative position securely upon a horse's hoof without the employment of any nails or other devices entering the hoof, while calk members are arranged associated with the structure adapted for maintaining the portions of the shoe properly assembled.

With these general objects in view and others that will appear as the nature of the invention is better understood the same consists in the novel combination, construction, and arrangement of parts hereinafter more fully described, illustrated in the accompanying drawing, and then claimed.

In the drawing, forming a part of this application and in which like designating characters refer to corresponding parts throughout the several views, Figure 1 is a top plan view of the device with the removable portion detached and with parts broken away.

Fig. 2 is a side elevation of the device assembled, and

Fig. 3 is a perspective view of the removable or locking section thereof.

It being understood that my device is adapted for attachment to the hoof of an animal such as a horse, the same primarily consists of an arch-shaped plate 10 of substantially the form of an ordinary horseshoe, adapted for flatly engaging the bottom of a hoof and arranged with suitable depending calks 11 upon its lower side. An inwardly extending and upwardly projecting flange 12 is arranged at the outer edge of the plate 10 having a removable section 13 at one side thereof provided with depending calks 11′ corresponding to the calks 11 and adapted for reception within notches 14 in the outer edge of the plate 10 when the section 13 is assembled upon the plate with the oblique wider end 15 of the flange section 13 arranged beneath the oblique end 16 of the main portion of the flange 12.

It will be seen from an examination of Fig. 1 of the drawing that the shoe may be slidably moved sidewise upon the hoof, not shown, with the flange 12 engaging the outer face of the hoof, while the section 13 may then be placed in position with its lower edge 17 mounted upon the outer edge of the plate 10 while said section 13 completes the formation of the flange 12 and is in contact with the hoof upon which the shoe is mounted. The calks 11′ being arranged within the notches 14, screws 18 may be inserted through openings 19 in the calks 11′ and secured within sockets 20 in the adjacent portion of the plate 10.

By removing the screws 18, the flange section 13 may be detached from the main section of the shoe, thereby permitting the shoe to be readily removed from the animal's hoof. It will be seen that the complete flange 12, 13 may be firmly contacted with the hoof which is seated upon the plate 10 within the inclosure formed by the flange while the shoe may be readily mounted upon a hoof and quickly detached therefrom whenever desired. When the device is assembled, the calks 11 and 11′ are uniformly arranged preventing slipping. The preferred embodiment of the invention being herein set forth, it will be understood that minor changes may be made therein without departing from the spirit and scope of the invention as claimed.

What I claim as new is:—

1. A device of the class described comprising an arch-shaped plate, an upwardly and inwardly projecting flange portion carried by the outer edge of said plate terminating a distance from one end of the plate, the said plate having notches in its outer edge at the unflanged portion thereof, depending calks removably secured within the said notches, similar calks depending from the outer edge of said plate at the opposite side of the shoe and a curved flange section integrally mounted upon the said detachable calks seated upon the portions of said plate between the notches adapted for engaging the adjacent free edge of the said plate flange.

2. A device of the class described comprising an arch-shaped plate having an inwardly projecting hoof engaging flange portion at one side thereof and with receiving notches at its opposite side, calks arranged within the said notches, a detachable flange section mounted upon said calks adapted for forming a continuation of the said plate flange when the device is assembled and hold-fast devices arranged through the said calks detachably secured to the plate.

In testimony whereof I affix my signature.

MATHEW MAGICH.

Copies of this patent may be obtained for five cents each, by addressing the "Commissioner of Patents, Washington, D. C."